(12) United States Patent
Schalkwijk et al.

(10) Patent No.: US 7,473,001 B2
(45) Date of Patent: Jan. 6, 2009

(54) MIRROR ADJUSTMENT MECHANISM WITH ELECTRICAL CONNECTION

(75) Inventors: Andreas Johannes Petrus Schalkwijk, Woerden (NL); Marius Brand, Amersfoort (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 0 days.

(21) Appl. No.: 10/497,559

(22) PCT Filed: Dec. 6, 2002

(86) PCT No.: PCT/NL02/00798

§ 371 (c)(1),
(2), (4) Date: Feb. 7, 2005

(87) PCT Pub. No.: WO03/047909

PCT Pub. Date: Jun. 12, 2003

(65) Prior Publication Data

US 2005/0141116 A1 Jun. 30, 2005

(30) Foreign Application Priority Data

Dec. 7, 2001 (NL) .................................. 1019524

(51) Int. Cl.
*G02B 7/182* (2006.01)
*B60R 1/06* (2006.01)

(52) U.S. Cl. .................. 359/841; 359/872; 248/479; 248/481

(58) Field of Classification Search .............. 359/841, 359/872, 877, 881; 248/481, 479
See application file for complete search history.

(56) References Cited

U.S. PATENT DOCUMENTS

| | | | | |
|---|---|---|---|---|
| 2,007,617 A | * | 7/1935 | Sheward | 439/8 |
| 2,117,967 A | * | 5/1938 | Leipold et al. | 362/105 |
| 2,911,607 A | * | 11/1959 | Booth | 439/8 |
| 3,116,940 A | * | 1/1964 | Jinesa | 280/422 |
| 3,328,741 A | * | 6/1967 | Brown | 439/8 |
| 3,493,295 A | * | 2/1970 | Kobrehel | 359/840 |
| 4,071,736 A | * | 1/1978 | Kamerling | 219/219 |
| 4,094,591 A | * | 6/1978 | Lafont | 359/876 |
| 4,153,342 A | * | 5/1979 | Mittelhauser | 359/874 |
| 4,167,306 A | * | 9/1979 | Longland | 359/876 |
| 4,268,018 A | | 5/1981 | Langanke | |
| 4,555,166 A | * | 11/1985 | Enomoto | 359/874 |
| 4,632,525 A | * | 12/1986 | Hayashi et al. | 359/874 |

(Continued)

FOREIGN PATENT DOCUMENTS

DE 4422572 A1 * 1/1996

(Continued)

OTHER PUBLICATIONS

PCT Search Report, PCT/NL02/00798 search completed Feb. 24, 2003.

*Primary Examiner*—Ricky D Shafer
(74) *Attorney, Agent, or Firm*—Dykema Gossett PLLC

(57) ABSTRACT

The invention is directed to a mirror adjustment mechanism with an electrical connection having at least one pair of contact parts disposed movably relative to each other. The contact parts jointly form a sliding contact for maintaining electrical contact during pivotal motion of a mirror connector relative to a base frame, while one of the contact parts of the sliding contact is fixedly connected with the mirror connector.

4 Claims, 2 Drawing Sheets

U.S. PATENT DOCUMENTS

| | | | | |
|---|---|---|---|---|
| 4,877,319 A | * | 10/1989 | Mittelhauser | 359/841 |
| 4,957,359 A | * | 9/1990 | Kruse et al. | 359/877 |
| 4,978,306 A | * | 12/1990 | Robb | 439/8 |
| 4,988,179 A | * | 1/1991 | Stensland | 359/877 |
| 5,755,526 A | * | 5/1998 | Stanevich | 403/122 |
| 6,244,714 B1 | * | 6/2001 | Mertens | 359/512 |
| 6,474,821 B2 | * | 11/2002 | Schieweck et al. | 359/877 |

FOREIGN PATENT DOCUMENTS

| | | |
|---|---|---|
| EP | 0 756 968 A1 | 2/1997 |
| EP | 1 209 031 A | 5/2002 |
| WO | WO 02/076791 A1 | 10/2002 |

* cited by examiner

MIRROR ADJUSTMENT MECHANISM WITH ELECTRICAL CONNECTION

REFERENCE TO RELATED APPLICATIONS

This application claims the benefit of National stage application (under 35 U.S.C. 371) of PCT/NL02/00798 filed Dec. 6, 2002, which claims the benefit to Netherlands Application No. 1019524, filed Dec. 7, 2001.

TECHNICAL FIELD

This invention relates to a mirror adjustment mechanism for a wing mirror of a motor vehicle, comprising a base frame which can be fixedly connected with a motor vehicle, and a mirror connector for supporting a mirror element, which mirror connector is pivotally connected with the base frame through a hinge construction, and wherein there is provided an electrical connection between the base frame and the mirror connector.

BACKGROUND OF THE INVENTION

Such a mirror adjustment mechanism is generally known and is used to incorporate a mirror element in a wing mirror of a motor vehicle in a pivotable manner, such that a driver can set the angular position of the mirror element relative to the vehicle to adjust his field of vision in rearward direction from the driver's seat via the mirror element.

The mirror adjustment mechanism is often provided with a mirror actuator provided with electrical drive means to enable the mirror element to be pivoted electrically, while the mirror connector is often integrated with a mirror support plate.

The electrical connection between the base frame and the mirror connector usually serves to realize functions for the purpose of the use of the mirror, such as, for instance, mirror heating, electric dimming of light shining in, and keeping the mirror water-free through vibrations. The electric components with which such functions are realized, for instance a heating element, an electrochrome glass or an ultrasonic motor, are often fitted on the mirror support plate but can also be fitted, for instance, on the mirror.

The base frame is usually fixed on a mirror base fitted near the door of the motor vehicle.

In the conventional mirror adjustment mechanisms, the electrical connection between the base frame and the mirror connector is often designed as one or more electrical connecting wires which are each fitted at two ends, through a plug connection, to the base frame and the mirror connector, respectively. The connecting wire between the base frame and the mirror connector can also be fitted through a soldered connection at one or both ends. To enable the mirror connector to pivot relative to the base frame, the conducting wire is made of flexible design.

There is a trend to realize more and more electrical functions for the purpose of the use of the mirror. Consequently, because this requires bundling of the connecting wires, it is difficult in practice to provide a sufficiently flexible electrical connection.

In addition, it is time consuming to fit such a bundled electrical connection between the base frame and the mirror connector. This is a problem in particular when it is taken into account that the mirror connector is often supplied as a subassembly, the mirror connector being provided with a mirror element and a number of electrical components for fulfilling utility functions of the mirror, such as a heating element, electrochrome glass or ultrasonic motor. The subassembly mentioned, further, is often supplied by a different supplier than the supplier of the other parts of the mirror adjustment mechanism, which likewise constitute a subassembly. Often, the two subassemblies of the mirror adjustment mechanism must then be electrically connected with each other in a reliable manner in large numbers by a third party. As the two subassemblies of the mirror adjustment mechanism are each made up of a large number of components, this entails an accumulation of dimensional tolerances, which makes it more difficult to assemble the mirror adjustment mechanism.

SUMMARY OF THE INVENTION

The object of the invention is to provide a mirror adjustment mechanism of the type mentioned in the opening paragraph, in which, while maintaining the advantages, the disadvantages mentioned can be obviated. In particular, the invention contemplates a mirror adjustment mechanism in which the electrical connection between the base frame and the connector can be effected in a reliable and efficient manner.

To that end, a mirror adjustment mechanism according to the invention is characterized in that the electrical connection comprises at least one pair of contact parts disposed movably relative to each other, which contact parts jointly form a sliding contact for maintaining the electrical contact during pivotal motion of the mirror connector relative to the base frame, while one of the contact parts of the sliding contact is fixedly connected with the mirror connector. As a result, what is achieved is that the electrical connection can easily be made of multiple design, while maintaining the flexibility of the electrical connection. In addition, because in each case one of the contact parts of the sliding contact is fixedly connected with the mirror connector, it is easy to carry out the assembly of the mirror adjustment mechanism from two subassemblies.

Advantageously, to that end, the mirror connector forms part of a subassembly which further comprises a mirror plate and one or more electrical components for fulfilling functions of use of the mirror plate.

By providing at least one of the contact parts of the sliding contact with a contact surface which is overdimensioned with respect to the surface of a conducting path over which the contact parts cooperate during pivotal motion, the influence of the accumulation of dimensional tolerances of the components from which the subassembly is built up can be reduced, so that assembling the mirror adjustment mechanism from two subassemblies can be facilitated.

By integrating the sliding contact into two parts of the hinge construction that are disposed movably relative to each other, the sliding contact can be realized in an elegant and reliable manner.

By including a flexible electrical conductor, also known by the name of flexfoil, in the electrical connection, the electrical connection can be simply made of multiple design.

The invention further relates to a method for assembling a mirror adjustment mechanism, wherein a first subassembly which comprises a base frame is electrically and mechanically pivotably connected with a second subassembly which comprises a mirror connector and electrical components, and wherein the electrical connection is effected by bringing contact parts of a sliding contact into engagement. Preferably, the electrical and mechanical connection takes place in one step, for instance in that both subassemblies comprise a hinge part in which a contact part of the sliding contact is included, which contact parts are brought into engagement by connecting the hinge parts with each other.

Further advantageous embodiments of the invention are set forth in the subclaims.

BRIEF DESCRIPTION OF THE DRAWINGS

The invention will be further elucidated on the basis of a number of exemplary embodiments which are represented in a drawing. In the drawing.

DETAILED DESCRIPTION OF THE EMBODIMENTS

Figure 1:
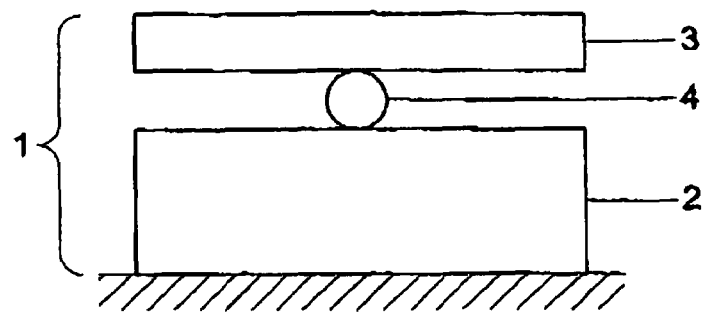
FIG. 1 shows a schematic front view of a mirror adjustment mechanism.

The figures concern only schematic representations of preferred embodiments of the invention. In the figures, the same or corresponding parts are indicated with the same reference numerals.

FIG. 1 shows a schematic representation of a mirror adjustment mechanism for a wing mirror of a motor vehicle. The mirror adjustment mechanism 1 comprises a base frame 2 which can be fixedly connected with a motor vehicle, in particular by mounting it on a support construction, not shown, which is connected with a mirror base on the door of the motor vehicle so as to be pivotable relative to a substantially upright base axis.

The mirror adjustment mechanism 1 further comprises a mirror connector 3 for supporting a mirror element which is not represented in this figure. Through a hinge construction 4, the mirror connector 3 is pivotally connected to the base frame 2.

Figure 2:
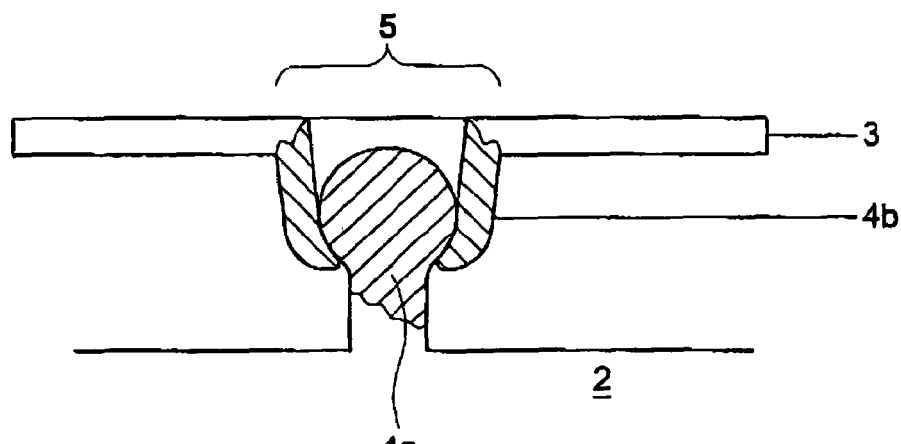
FIG. 2 shows a cross section of a first embodiment of the hinge construction of the mirror adjustment mechanism outlined in FIG. 1.

FIG. 2 is a cross section of a first preferred embodiment of the hinge construction of the mirror adjustment mechanism from FIG. 1. The hinge construction is designed as a ball-and-socket joint consisting of a substantially ball-shaped first hinge part 4a which is fixedly connected with the base frame 2, and a substantially socket-shaped second hinge part 4b which is fixedly connected with the mirror connector 3.

Figure 3:
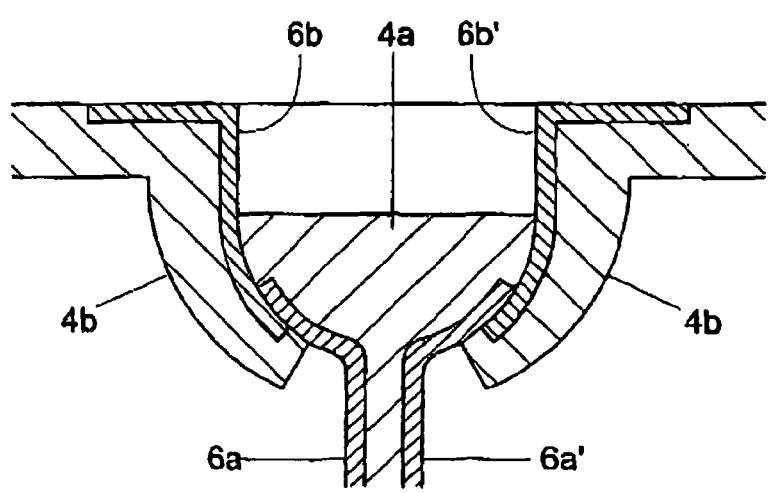
FIG. 3 shows a detail of the embodiment of FIG. 2, with two sliding contacts included therein.

FIG. 3 shows a preferred embodiment of an electrical connection 5 for the hinge construction of FIG. 2.

The electrical connection 5 comprises two pairs of contact parts 6a, 6b; 6a', 6b', disposed movably relative to each other, for maintaining the electrical contact during pivoting of the mirror connector 3 relative to the base frame 2. Of each pair of contact parts 6a, 6b; 6a', 6b' of the sliding contacts 5, in each case one of the contact parts 6a; 6a' is fixedly connected with the fixed base frame 2, more specifically the ball-shaped hinge part 4a, while the corresponding contact parts 6b, 6b' are fixedly connected with the mirror connector, more specifically the socket-shaped hinge part 4b. It will be clear that the contact parts 6b, 6b' can also be incorporated in a different part of the mirror connector 3, as long as the corresponding parts 6a, 6a' are at the same time incorporated in the base part 2 in such a manner that when the mirror connector 3 pivots relative to the base frame 2, the contact parts 6a, 6a' continue to make contact with the corresponding contact parts 6b, 6b' at all times. Preferably, however, the contact parts form part of the hinge part 4, so that the relative displacements can be kept as small as possible.

Figure 4:
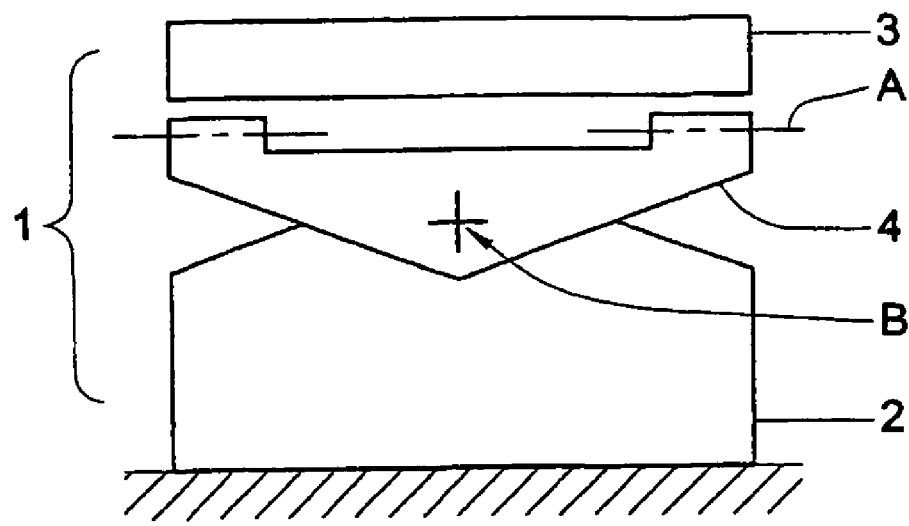
FIG. 4 shows a cross section of a second embodiment of the hinge construction of the mirror adjustment mechanism outlined in FIG. 1.

FIG. 4 is a front view of a second preferred embodiment for the hinge construction of the mirror adjustment mechanism from FIG. 1. The hinge construction consists of a crosspiece 4, connected with the mirror connector 3 so as to be pivotable about a first main axis A, and further connected with the base frame 28 so as to be pivotable about a second main axis B, with main axis B being substantially perpendicular to main axis A, and both axes being situated in planes substantially parallel to the mirror plane. Preferably, the two axes intersect in one point, so that a kinematic equivalent of a ball hinge is obtained.

Figure 5:
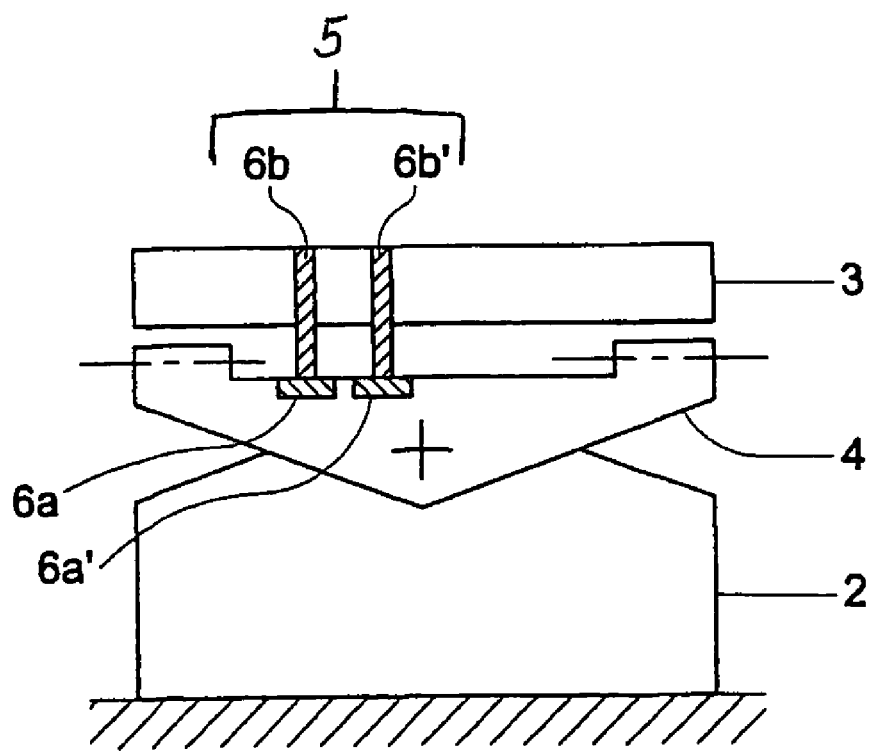
FIG. 5 shows a detail of the embodiment of FIG. 4, with two sliding contacts included therein.

FIG. 5 shows a preferred embodiment of an electrical connection 5 for the hinge construction of FIG. 4.

The electrical connection 5 comprises two pairs of contact parts 6a, 6b; 6a', 6b', disposed movably relative to each other, for maintaining the electrical contact during pivoting of the mirror connector 3 relative to the crosspiece 4 about axis A. Of each pair of contact parts 6a, 6b; 6a', 6b' of the sliding contacts 5, in each case one of the contact parts 6b; 6b' is fixedly connected with the mirror connector 3, for instance in the form of resilient elements at the underside of the mirror connector 3. The corresponding contact parts 6a, 6a' are incorporated in the crosspiece 4, such that, when the mirror connector 3 pivots about main axis A, they form a sliding contact with contact parts 6b, 6b'. In a preferred embodiment, the contact parts 6a, 6a' are part of a flexible electrical conductor, not shown, of which the part with the contact parts 6a, 6a' is fixedly connected wit the crosspiece 4, and another part is fixedly connected with the base frame 2, so that crosspiece 4 can pivot relative to the fixed base frame 2 about main axis B without the electrical contact being broken. In a preferred embodiment, the contact parts 6a, 6a' can be designed in the form of resilient elements, while the contact parts 6b, 6b' form part of a heating element, not shown, which forms part of the mirror connector.

The invention claimed is:

1. A mirror adjustment mechanism for a wing mirror of a motor vehicle, comprising:
   a base frame which can be fixedly connected with a motor vehicle,
   a mirror connector adapted to support a mirror element,
   a hinge construction, that provides more than one degree of rotational freedom and
   an electrical connection between the base frame and the mirror connector, wherein the electrical connection includes at least one pair of contact parts disposed movably relative to each other, the contact parts jointly forming a sliding contact for maintaining the electrical connection during pivoting of the mirror connector relative to the base frame, and wherein one of the contact parts of the sliding contact is fixedly connected with the mirror connector and a part of the hinge construction is integrated into the mirror connector.

2. A mirror adjustment mechanism according to claim 1, wherein at least one of the pair of contact parts of the sliding contact is larger than at least another of the pair of the contact parts.

3. A mirror adjustment mechanism according to claim 1, wherein the sliding contact is integrated into two parts of the hinge construction which are disposed movably relative to each other.

4. A mirror adjustment mechanism according to claim 1, wherein the hinge construction comprises a ball hinge with two hinge parts cooperating as a ball and a socket.

\* \* \* \* \*